United States Patent
Spring

[19]

[11] Patent Number: 5,952,112
[45] Date of Patent: *Sep. 14, 1999

[54] MULTILAYER, COLD DEFORMABLE COMPOSITE METAL ARTICLE CAPABLE OF BEING DEEP DRAWN

[75] Inventor: Markus Spring, Eschlikon, Switzerland

[73] Assignee: Clad Lizenz Ag, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/734,095

[22] Filed: Oct. 21, 1996

Related U.S. Application Data

[63] Continuation of application No. 08/403,219, Mar. 13, 1995, abandoned.

[30] Foreign Application Priority Data

Mar. 18, 1994 [EP] European Pat. Off. .............. 94104314

[51] Int. Cl.⁶ .............. H05B 6/12; A47J 36/02; B32B 15/18
[52] U.S. Cl. .............. 428/653; 428/654; 428/685; 220/573.1; 99/DIG. 14
[58] Field of Search ..................... 428/635, 653, 428/685, 683, 654; 126/390; 99/DIG. 14; 219/620, 621; 220/573.1

[56] References Cited

U.S. PATENT DOCUMENTS

| | | | |
|---|---|---|---|
| 932,242 | 8/1909 | Berry | 219/620 |
| 3,261,724 | 7/1966 | Vlam | 428/653 |
| 3,269,004 | 8/1966 | Smith et al. | 428/653 |
| 3,352,005 | 11/1967 | Avellone | 228/190 |
| 3,530,499 | 9/1970 | Schroeder | 219/627 |
| 3,564,585 | 2/1971 | Camp | 428/653 |
| 3,630,694 | 12/1971 | Enright et al. | 428/653 |
| 3,684,853 | 8/1972 | Welch et al. | 219/621 |
| 3,697,716 | 10/1972 | Kornrumpf | 219/620 |
| 3,742,173 | 6/1973 | Kornrumpf et al. | 219/625 |
| 3,761,668 | 9/1973 | Harnden et al. | 219/621 |
| 3,883,315 | 5/1975 | Savolainen et al. | 428/596 |
| 3,966,426 | 6/1976 | McCoy et al. | 428/653 |
| 4,246,045 | 1/1981 | Ulam | 428/653 |
| 4,303,741 | 12/1981 | Klein | 428/653 |
| 4,564,001 | 1/1986 | Maeda | 428/653 |
| 4,596,236 | 6/1986 | Eide | 126/390 |
| 4,646,935 | 3/1987 | Ulam | 428/653 |
| 4,705,727 | 11/1987 | Hunter | 126/390 |
| 5,064,055 | 11/1991 | Bessenbach et al. | 126/390 |
| 5,345,667 | 9/1994 | Coppier | 29/505 |
| 5,506,062 | 4/1996 | Flammang | 428/653 |

FOREIGN PATENT DOCUMENTS

| | | |
|---|---|---|
| 61526/73 | 8/1993 | Australia . |
| 434291 | 6/1939 | Belgium . |
| 0 577 069A1 | 5/1994 | European Pat. Off. . |
| 1 577 130 | 8/1963 | Germany . |
| 3336736 A1 | 8/1983 | Germany . |
| 85 30 324 | 10/1985 | Germany . |
| 61-206636 | 9/1986 | Japan ..................... 428/653 |
| 1116377 | 6/1968 | United Kingdom . |

OTHER PUBLICATIONS

Search Report from the EPO dated Sep. 6, 1994, for EP 94 10 4314.

Primary Examiner—John J. Zimmerman
Attorney, Agent, or Firm—Olson & Hierl, Ltd.

[57] ABSTRACT

The composite article includes a core layer of an aluminium alloy. This core layer is arranged between two outer layer portions which are structured as mere images of each other relative to the core layer. Such an outer layer portion may include a layer of pure aluminium arranged on the core layer followed by a layer of carbon steel and finally a layer of an austenitic high-grade steel forming the outermost layer. This composite article has an excellent heat conducting property and is easily magnetizable. The arrangement of the individual layers does not lead to difficulties such as detaching of layers, rupturing of layers or the forming of waves during a cold deforming, drawing etc. of the composite article.

11 Claims, 1 Drawing Sheet

MULTILAYER, COLD DEFORMABLE COMPOSITE METAL ARTICLE CAPABLE OF BEING DEEP DRAWN

This application is a continuation of application Ser. No. 08/403,219 filed Mar. 13, 1995 now abandoned.

BACKGROUND OF THE INVENTION

1. Field of the Invention

The present invention relates to a multilayer, cold deformable composite metal article capable of being deep drawn. It also relates to a cooking utensil, produced from such a composite metal article.

2. Description of the Prior Art

Such a composite article consisting of a plurality of layers connected to each other must feature, depending on the final product to which it is worked, a large variety of differing properties. The properties of the individual layers are, thereby, combined in an ideal way. It is thereby by all means possible that certain properties, e.g. deforming properties of a multilayer article are substantially different from the deforming properties, which could be expected from every single material of the individual layers.

There are now applications, which demand a composite article which is not only capable of being cold deformed and deep drawn, but which is also heat conductive and magnetizable.

An example of an application of such a multilayer composite article can be a multilayer, deep drawn cooking utensil having a bottom portion and a wall portion formed integrally with the bottom portion, whereby the structure of the cross section of the bottom portion is the same as the structure of the cross section of the side wall portion.

Such cooking utensils should lend themselves to be used with traditional energy sources such as gas, electricity or halogen, but also specifically on induction ranges.

The multilayer composite article, from which such a cooking utensil is produced, must have good heat conducting properties and at the same time must be magnetizable. Furthermore at least the raw material article made as a composite article must be capable of being deep drawn for the production of such a cooking utensil.

Known cooking utensils which have been deep drawn from known multilayer composite layers feature on the one hand an inferior long-term behavior specifically of the bottom portion, in that deformations occur, i.e. the utensil supporting surface of the bottom portion deforms after a prolonged use. On the other hand and specifically the production suffers from a large number of rejects, scrap. When, for instance, such composite articles are deep drawn, re-drawn and re-pressed, the individual layers, which originally have been bound together, detach themselves from each other and/or tear, and specifically when deforming ferritic stainless steels by 90° relative to the direction of rolling, zones of reduction or contraction occur, which look like grooves or waves, a symptom which in the art is called fluted and necessitates by at least one further production step a grinding of the product. Other multilayer composite articles do not lend themselves to the same deforming ratios.

SUMMARY OF THE INVENTION

It is, therefore, a general object of the present invention to provide a multilayer, cold deformable composite metal article capable of being deep drawn which can be easily worked, is of low cost and is heat conductive and magnetizable and also has a low weight.

A further object is to provide a multilayer, cold deformable composite metal article capable of being deep drawn which includes a core layer, two outer layer portions, which core layer is sandwiched between the two outer layer portions, and which core layer contains pure aluminium or an aluminium alloy, which outer layer portions contain a austenitic and/or a ferromagnetic steel, and which outer layer portions are structured as mirror images of each other relative to the core layer.

Still a further object is to provide a multilayer, cold deformable composite metal article capable of being deep drawn, which lends itself for the production of articles having an excellent long term behavior regarding deformations and a high degree of deformability, such that during the production of such article no dislocations of single layers, no detaching of individual layers and no ruptures of the individual layers of the composite article occur and thus hardly any waste is produced, whereby the produced article shall have a low weight and be cheap to manufacture.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

An example of an article produced from the inventive composite article is a cooking utensil, which will now be described also regarding its production hereinbelow.

In order to produce the cooking utensil a composite article having in accordance with the desired design a plurality of layers is initially produced as a raw material and is subjected to various known production steps common to producing a multilayer composite article, among others this raw material is rolled. After the rolling a deep drawing is applied, such to form the bottom portion 6 and the wall portion 7 of the cooking utensil. Possibly a closing or beading 8 at the edge of the wall portion is made during a later production step such as schematically designed in FIG. 1.

It is obvious that with regard to a mutual adhering of the various layers the area of transition between the bottom portion 6 and the wall portion 7 and also along mentioned two portions 6 and 7 is extremely critical because the various layers are plastically deformed. Furthermore it is possible that wave or groove shaped deformations occur during a cold deforming, specifically where a side wall portion is deep drawn in the direction extending 90° to the direction of the rolling.

Figure 1:
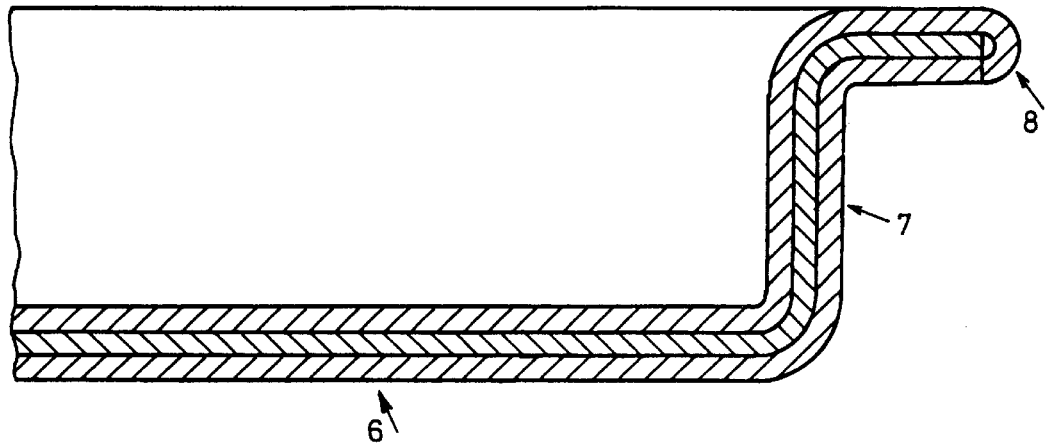
FIG. 1 is a section through a part of a cooking utensil produced from a composite article, which cooking utensil has a bottom portion and a side wall portion formed integrally with the bottom portion.

Regarding the illustration of FIG. 1 it shall be noted that the layers designed in these figures are only representative and that also more than three layers can be present such as generally known to the person skilled in the art.

Attention is now drawn basically to FIGS. 2–9, in which various embodiments of the invention based on a part of a cross section of the composite article are illustrated.

In each embodiment a core layer 1 consisting of pure aluminium or an aluminium alloy is present. The aluminium alloy can have a composition in accordance with the types AA-3003 or AA-3004. The object of this core layer of pure aluminium or of an aluminium alloy is on the one hand to save on weight and on the other hand aluminium is an excellent heat conductor which is decisive regarding a proper result of the cooking.

At both sides of this core layer 1 an outer layer portion is present, which as will be shown, can be structured in differing manners. Decisive is that the respective outer layer portions are designed or structured, respectively, as mirror images of each other relative to the core layer. These outer layer portions contain basically an austenitic and/or a ferromagnetic steel.

Figure 2:
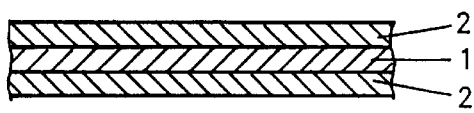
FIGS. 2–9 illustrate various preferred embodiments of layer arrangements of the inventive composite article.

FIG. 2 illustrates a first embodiment, which includes a core layer 1 of pure aluminium or of an aluminium alloy, which is covered at both sides by a layer 2 of a ferritic stainless steel. This ferritic high-grade steel ensures magnetizability and also the corrosion-resisting quality. The ferritic stainless steel can be a Cr or a CrMo-steel with a content of 10–30, preferably 12–25 percent by weight Cr and in case of an addition content on Mo, said content amounts to 0.2–5, preferably 1–2 weight percent Mo. Suitable steels are ferritic stainless steels of the range of the series AISI 400 to 499, specifically ferritic stainless steels of the qualities AISI 409, AISI 430, AISI 434, AISI 436 and AISI 444.

These ferritic stainless steels form accordingly the layer 2 of the embodiment according to FIG. 2.

It is to be noted in this respect that at all further embodiments which have layers 2 of a ferritic stainless steel such steel is one of the ferritic stainless steels of the range of the series AISI 400–499 mentioned above.

Figure 3:
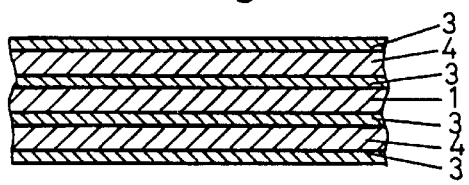

FIG. 3 illustrates a further embodiment, in which again a core layer 1 of pure aluminium or of an aluminium alloy is present.

In this embodiment, however, the ferromagnetic steel which forms the layer 4 is a carbon steel, for instance, a steel of the series AISI 1005–1010. Carbon steel costs obviously less than ferritic high-grade steel and can be worked more easily. Carbon steel has, however, the drawback that it will rust. Accordingly, according to FIG. 3 every carbon steel-layer 4 is located between two thinner layers 3 of an austenitic, stainless stainless steel. Thus, a respective outer layer portion is formed of two layers 3 of an austenitic stainless steel and a layer 4 of carbon steel arranged between the two layers 3. As can clearly be seen, the two outer layer portions 3-4-3 are arranged in a mirror image arrangement relative to the core layer 1, whereby additionally each outer layer portion 3-4-3 includes in itself layers 3, here consisting of an austenitic stainless steel arranged as mere images relative to the carbon steel layer 4.

The austenitic stainless steel contains 15–29 percent by weight, preferably 12–22 percent by weight Cr and 3–25 percent by weight Ni. Possibly it contains additionally 0.2–5 percent by weight, preferably 1–3 percent by weight Mo. It is a stainless steel of the range of the series AISI 200–399 and specifically a stainless steel with the qualities in accordance with AISI 304 or AISI 316. Also here every layer 3 of the various illustrated embodiments contains one of the above mentioned austenitic stainless steels.

Figure 4:
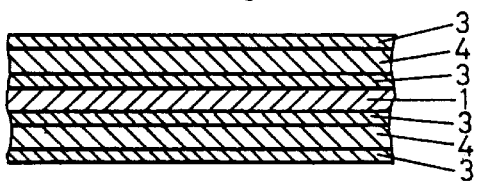

The embodiment according to FIG. 4 illustrates a core layer 1 of pure aluminium or of an aluminium alloy of the kind set forth above, which is arranged between two outer layer portions, of which each contains a layer 2 of a ferritic stainless steel sandwiched between two layers 3 of austenitic high-grade steels.

Figure 5:
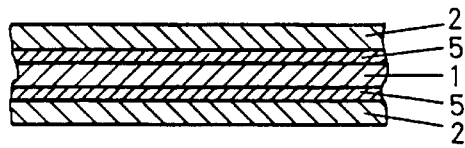

FIG. 5 illustrates an embodiment, in which the core layer 1 consists of an aluminium alloy only. Analog to the embodiment according to FIG. 2 the two outermost layers 2 consist of a ferritic stainless steel. At this embodiment a layer 5 of pure aluminium is arranged between a respective outermost layer 2 and the core layer 1, such that the respective outer layer portion consists of a layer 2 of a ferritic stainless steel and a layer 5 of pure aluminium.

Figure 6:
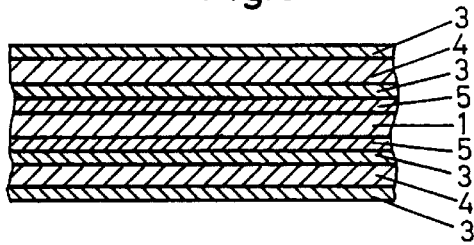

The embodiment according to FIG. 6 is comparable with the embodiments according to FIGS. 3 and 5, respectively, in that again a layer 5 of pure aluminium is located at both sides of the core layer 1 consisting of an aluminium alloy. Accordingly, a respective outer layer portion consists of a layer 5 of pure aluminium, followed by the layers 3 (austenitic stainless steel), 4 (carbon steel) and 3 (austenitic stainless steel).

Figure 7:
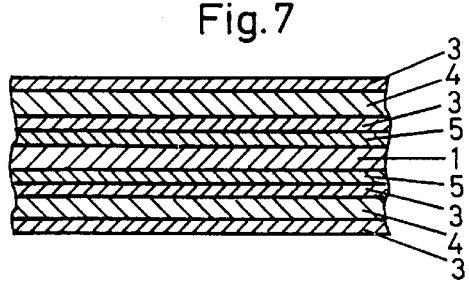

FIG. 7 illustrates a further embodiment comparable with the embodiment of FIG. 4 or 5, respectively. The core layer 1 of an aluminium alloy is followed at both sides by a layer 5 of pure aluminium, a layer 3 of an austenitic high-grade steel, a layer 2 of a ferritic stainless steel and finally a further layer 3 of an austenitic stainless steel.

Figure 8:
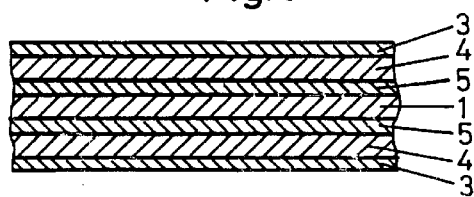

The embodiment according to FIG. 8 illustrates a core layer 1 consisting of an aluminium alloy. At both sides of this core layer a layer 5 of pure aluminium is located. The layer 5 of pure aluminium is followed by a layer 4 of carbon steel and a further layer 3 of an austenitic stainless steel. Again, the layers 5, 4, 3 are arranged as mere images of each other relative to the core layer 1.

Figure 9:
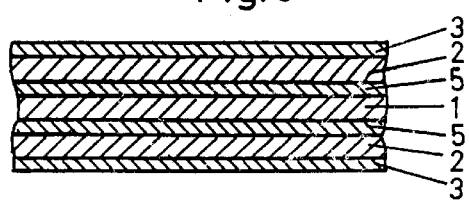

FIG. 9 illustrates an embodiment having a core layer 1 of an aluminium alloy followed at both sides by a layer 5 of pure aluminium. Each layer 5 of pure aluminium is followed by a layer 2 of a ferritic stainless steel and a further layer 3 of an austenitic stainless steel.

The production of the multilayer composite article is made in accordance with generally known methods.

Thus, a composite article having a plurality of layers is present which has excellent heat conducting properties and is easily magnetizable and which can be processed easily specifically by a cold shaping or forming, respectively, to, for instance, a cooking utensil.

While there are shown and described present preferred embodiments of the invention, it is to be distinctly understood that the invention is not limited thereto, but may be otherwise variously embodied and practiced within the scope of the following claims.

I claim:

1. A multi layer, cold deformable composite metal article for use in forming a deep drawn product comprising:
   a core layer portion;
   two outer layer portions;
   which core layer portion consists of pure aluminum or an aluminum alloy and is sandwiched between said two outer layer portions;
   and which outer layer portions are structured as mirror images of each other relative to said core layer portion;
   each outer layer portion consisting of two layers, each of an austenitic stainless steel and;
   a further layer of a ferromagnetic ferritic stainless steel or a carbon steel sandwiched between said two layers of austenitic stainless steel, whereby a seven layer symmetrical composite metal article is provided that can be deep drawn with no dislocation of the layer portions with respect to one another.

2. The composite metal article of claim 1, in which said ferritic stainless steel is a Cr or CrMo-steel which includes 10–30 percent by weight Cr.

3. The composite metal article of claim 1 in which said austenitic stainless steel is a CrNi or CrNiMo-steel and includes 15–29 percent by weight Cr and 3–25 percent by weight Ni.

4. The composite metal article of claim 1, in which said austenitic stainless steel is a CrNi or CrNiMo-steel and includes 15–29 percent by weight Cr and 3–25 percent by weight Ni, and 0.2–5 percent by weight Mo.

5. The composite metal article of claim 4, in which said austenitic stainless steel includes 15–22 percent by weight Cr, 3–25 percent by weight Ni, and 1–3 percent by weight Mo.

6. A deep drawn cooking utensil for use with induction heating, produced from a composite metal article in accordance with claim 1, said cooking utensil comprising a bottom portion and an adjacent side wall portion, which side wall portion is formed integrally with the bottom portion, in which the structure of the cross section of the bottom portion is the same as the structure of the cross section of the side wall portion, whereby there is formed a deep drawn cooking utensil with no dislocation of layer portions.

7. The composite metal article of claim 1, in which said austenitic stainless steel includes 15–22 percent by weight Cr, 3–25 percent by weight Ni, and 1–3 percent by weight Mo.

8. A deep drawn cooking utensil for use with induction heating, produced from a composite metal article comprising a core layer; two outer layer portions; which core layer is sandwiched between said two outer layer portions; which core layer contains pure aluminum or an aluminum alloy; which outer layer portions each comprise a ferromagnetic ferritic stainless steel; and which outer layer portions are structured as mirror images of each other relative to said core layer, whereby there is formed a symmetrical composite metal article that can be deep drawn with no dislocation of the layer portions with respect to one another, said cooking utensil comprising a bottom portion and an adjacent side wall portion, which side wall portion is formed integrally with the bottom portion, and in which the structure of the cross section of the bottom portion is the same as the structure of the cross section of the side wall portion, whereby there is formed a deep drawn cooking utensil with no dislocation of layer portions.

9. The deep drawn cooking utensil of claim 8, in which said core layer of said composite metal article comprises an aluminum alloy and in which an intermediate layer of pure aluminum is located between each outer layer portion and said core layer.

10. A multilayer, cold deformable composite metal article for use in forming a deep drawn product comprising:

a core layer portion;

two outer layer portions;

which core layer portion consists of pure aluminum or an aluminum alloy and is sandwiched between said two outer layer portions;

and which outer layer portions are structured as mirror images of each other relative to said core layer portion;

each outer layer portion consisting of two layers, each of an austenitic stainless steel, and;

a further layer of ferromagnetic ferritic stainless steel or a carbon steel sandwiched between said two layers of austenitic stainless steel, wherein the core layer portion includes a core layer of aluminum alloy sandwiched between two layers of pure aluminum, thereby forming a nine layer symmetrical composite metal article that can be deep drawn with no dislocation of the layer portions with respect to one another.

11. A cooking utensil for use with induction heating, produced from a composite metal article in accordance with claim 10, said cooking utensil comprising a bottom portion and an adjacent side wall portion, which side wall portion formed integrally with the bottom portion, in which the structure of the cross section of the bottom portion is the same as the structure of the cross section of the side wall portion, whereby there is formed a deep drawn cooking utensil with no dislocation of layer portions.

* * * * *